US010760670B2

(12) United States Patent
Wurzberger et al.

(10) Patent No.: US 10,760,670 B2
(45) Date of Patent: *Sep. 1, 2020

(54) DISTRIBUTION GEARING AND ELECTRIC DRIVE UNIT HAVING A DISTRIBUTION GEARING

(71) Applicant: Schaeffler Technologies AG & Co. KG, Herzogenaurach (DE)

(72) Inventors: Philip Wurzberger, Nürnberg (DE); Thorsten Biermann, Wachenroth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 245 days.

This patent is subject to a terminal disclaimer.

(21) Appl. No.: 15/753,987

(22) PCT Filed: Aug. 11, 2016

(86) PCT No.: PCT/DE2016/200374
§ 371 (c)(1),
(2) Date: Feb. 21, 2018

(87) PCT Pub. No.: WO2017/036472
PCT Pub. Date: Mar. 9, 2017

(65) Prior Publication Data
US 2018/0238431 A1    Aug. 23, 2018

(30) Foreign Application Priority Data

Sep. 4, 2015    (DE) .................. 10 2015 216 978

(51) Int. Cl.
*F16H 48/42*    (2012.01)
*B60K 1/02*    (2006.01)
(Continued)

(52) U.S. Cl.
CPC ............. *F16H 57/029* (2013.01); *B60K 1/00* (2013.01); *B60K 1/02* (2013.01); *B60K 17/346* (2013.01);
(Continued)

(58) Field of Classification Search
CPC ............ F16H 57/029; F16H 2048/106; F16H 48/00–42; B60K 1/00; B60K 1/02;
(Continued)

(56) References Cited

U.S. PATENT DOCUMENTS

| 5,443,130 | A | * | 8/1995 | Tanaka | ..................... B60K 1/00 |
| | | | | | 180/65.6 |
| 10,527,143 | B2 | * | 1/2020 | Wurzberger | ............. F16H 48/10 |
| 2015/0045170 | A1 | * | 2/2015 | Ohmura | .................. F16H 48/42 |
| | | | | | 475/221 |

FOREIGN PATENT DOCUMENTS

| CN | 101498351 A | 8/2009 |
| CN | 202867718 U * | 4/2013 |

(Continued)

Primary Examiner — David R Morris
Assistant Examiner — Lillian T Nguyen
(74) Attorney, Agent, or Firm — Reid A. Baldwin

(57) ABSTRACT

A transfer gearbox may include an input shaft, two output shafts, two output gears, two sets of compensating gears, and a differential cage. The output gears may be arranged axially next to one another on a joint axis of rotation and are rotatable relative to one another. The first output gear may sit in a rotationally fixed manner on the first output shaft and the second output gear may sit in a rotationally fixed manner on the second output shaft and the output shafts lie opposite one another at a front side. At least one output shaft may be guided through a shaft feed-through rotatably about the axis of rotation relative to the shaft feed-through. At least the first output gear may be provided with a seal, wherein the seal (Continued)

bears in a sealing manner against a rotationally symmetrical surface portion of the shaft feed-through.

11 Claims, 3 Drawing Sheets

(51) Int. Cl.
*B60K 17/346* (2006.01)
*F16H 57/029* (2012.01)
*B60K 1/00* (2006.01)
*F16H 48/11* (2012.01)
*F16H 48/10* (2012.01)

(52) U.S. Cl.
CPC ............. *F16H 48/11* (2013.01); *F16H 48/42* (2013.01); *B60K 2001/001* (2013.01); *F16H 2048/106* (2013.01)

(58) Field of Classification Search
CPC .............. B60K 17/346; B60K 2001/001; F16J 15/32–3236
See application file for complete search history.

(56) References Cited

FOREIGN PATENT DOCUMENTS

| | | |
|---|---|---|
| CN | 103133632 A | 6/2013 |
| CN | 104136814 A | 11/2014 |
| DE | 202011110104 U1 | 11/2012 |
| DE | 102011087570 A1 | 6/2013 |
| DE | 102013203762 A1 | 9/2014 |
| DE | 102016205263 B3 * | 6/2017 ............. H02K 5/124 |
| EP | 2821672 A1 | 1/2015 |
| JP | 2002235832 A | 8/2002 |

* cited by examiner

DISTRIBUTION GEARING AND ELECTRIC DRIVE UNIT HAVING A DISTRIBUTION GEARING

CROSS-REFERENCE TO RELATED APPLICATIONS

This application is the U.S. National Phase of PCT Appln. No. PCT/DE2016/200374 filed Aug. 11, 2016, which claims priority to DE 102015216978.2 filed Sep. 4, 2015, the entire disclosures of which are incorporated by reference herein.

TECHNICAL FIELD

The disclosure relates to a transfer gearbox having at least one input shaft, having a first output shaft as well a second output shaft, having two output gears, first compensating gears as well as second compensating gears and having a differential cage.

BACKGROUND

Such a transfer gearbox is described in EP 2 821 672 A1 as a component of an electric drive unit. The electric drive unit has a rotor shaft which is the input shaft of a transmission device. The transmission device is formed from a differential gearbox and from a reduction gear stage. The reduction gear stage is a planetary drive, the sun gear of which sits on the rotor shaft. The differential is what is known as a spur gear differential in which the compensating gears are planetary gears and the output gears are sun gears. Each sun gear sits on an output shaft of the differential. The torques introduced via the input shaft/rotor shaft are input via the reduction gear stage into the differential and distributed via the differential to the output shafts and thus to driven vehicle wheels. The rotor shaft is a hollow shaft through which one of the output shafts is guided. An annular gap is formed between the rotor shaft and the output shaft. The output shaft and the respective sun gear are connected to one another in a rotationally fixed manner via a spline. The region of the electric machine between the stator and the rotor should, apart from wet-running electric motors, be kept free from lubricating oil. The transmission device is, however, lubricated with transmission oil. There are drive units in which the annular gap between the output shaft and the rotor shaft is used as an oil duct in order, for example, to supply lubricating oil to an anti-friction bearing which lies axially on the outside. There are, however, also drive units in which the anti-friction bearing which lies axially on the outside is lubricated in other ways or is lubricated over its lifespan.

For the sake of simplicity, the sun gears of differentials are generally provided with through-holes, so that the inner spline can be produced in an unhindered manner. The output shaft is provided with an outer spline which corresponds to the inner spline of the sun gear. This known plug-in connection is very easy to mount and is therefore very readily used. In terms of oil leaks, the plug-in connection between the sun gears of a differential is a weak point of the transfer gearbox since this is embodied with clearance. Lubricating oil can escape to the outside as a result of the leakage gaps associated with the clearance.

SUMMARY

An object of the disclosure is to seal a transfer gearbox in a reliable manner with respect to the connecting shafts.

This object may be achieved according to the subject matter disclosed in the description and the figures.

According to the disclosure, it is provided that at least one of the output gears of the transfer gearbox bears at least one seal, e.g., also provides the seat for a seal which is fixedly installed in the sun gear. The seal bears in a sealing manner against a surface portion of the hollow shaft which is rotatable about the axis of rotation relative to the first sun gear. The hollow shaft is, for example, a further transmission shaft or a rotor shaft or an elongation or a connecting piece to the rotor shaft.

The general structure and the function of transfer gearboxes have long been known in the expert field. The transfer gearboxes affected by the disclosure are gearboxes in which torques acting on at least one input shaft are distributed via compensating gears in equal or unequal parts to at least two output shafts. Transfer gearboxes are, in this sense, for example, arranged longitudinally between two driven axles. In this case, each output shaft leads to a driven vehicle axle. Differentials are transfer gearboxes in which the torques are distributed to the drive shafts of vehicle wheels of an axle. The compensating gears are conically embodied gears or spur gears. The output gears of the transfer gearbox are sun gears with a conical shape or spur gears.

As a result of the seal being received in the output gear, no or little additional installation space is required for the seal since the seal can be integrated into existing projections (e.g. into a hub) of the sun gear. It is alternatively provided that the seal seat is a hollow-cylindrically formed ring. The ring sits with a portion fixedly on a hub of the output gear. As a result of such a configuration of the disclosure, the output gear without a seal seat can have a simpler configuration. The hollow-cylindrical ring is a simple component which can be produced at low cost.

The transfer gearbox is preferably embodied as a planetary gearbox, the compensating and output gears of which are spur gears. The compensating gears are planetary gears and the output gears are sun gears.

The disclosure helps to prevent the escape of leaking oil via the plug-in connection, in particular if, as one configuration of the disclosure provides, the through-hole in the sun gear is closed with the seal by a closure element. With such an arrangement, the transmission device can be sealed off by the seal with respect to the annular gap between the hollow shaft and the output shaft and by the closure element with respect to the plug-in connection. The closure element can be a plug which sits in the through-hole or a cover. Alternatively, a cover with an edge is placed on the outside of a hub of the sun gear.

Configurations of the disclosure also relate to an electric drive unit which has a differential with the features according to the disclosure.

In the electric drive units of the type according to the disclosure, the annular gap between rotor shaft or hollow shaft and output shaft should remain dry. If the transmission device is not adequately sealed off, e.g. lubricating oil can reach the rotor shaft, which is heated during operation, and resinify or carbonize there. Deposits which are undesirable in the long term can arise in the annular gap as a result of this. The arrangement according to the disclosure can prevent oil from reaching the annular gap in particular if, as one configuration of the disclosure provides, the seal is a radial shaft seal (a radial shaft sealing ring).

The radial shaft sealing ring has at least one sealing lip, preferably of NBR (Nitrile Butadiene Rubber) or polymers such as PTFE (Polytetrafluoroethylene) and a hollow-cylindrical seat portion, preferably having a metallic reinforcing ring. It sits fixedly in the sun gear or in a ring on the sun gear. The sealing lip runs out on the surface portion of the hollow shaft. The contact pressure of the sealing lip is optionally amplified by a tube spring (worm spring). Lubricating oil forms a relatively solid pressure film on the surface of a rotating connection. Despite this, it creates a radial shaft sealing ring to hold back the lubricating oil reliably at the cutoff point between hollow shaft and transmission device in the transmission device and is advantageously suitable in particular for use in an electric drive unit.

DETAILED DESCRIPTION

Figure 1:
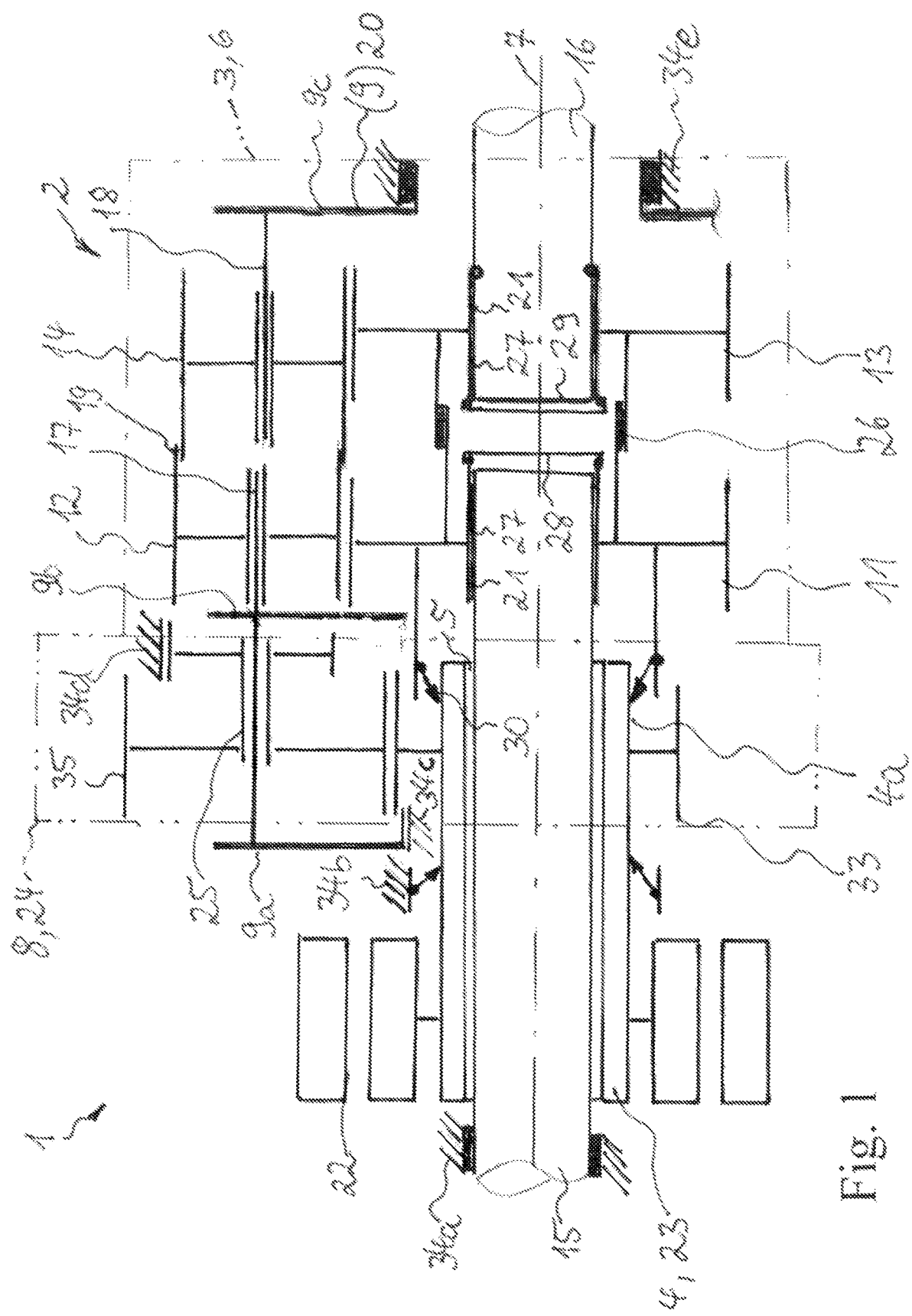
FIG. 1 is a schematic diagram of an electric drive unit, according to an embodiment.

FIG. 1 shows, not to scale, a diagram of an electric drive unit 1 which has a transmission device 2 with an exemplary embodiment of a transfer gearbox 3 embodied as a differential, in a longitudinal section along central axis 7 of the drive unit. An electric machine 22 is operatively connected via a rotor shaft embodied as hollow shaft 23 with a reduction gearbox 24 of transmission device 2. Reduction gearbox 24 is a planetary drive 8. Double planetary gears 25 (composed of two planetary gears connected fixedly to one another) form a connecting connection between reduction gearbox 24 and transfer gearbox 3. The transfer gearbox is a planetary drive 6.

Figure 2:
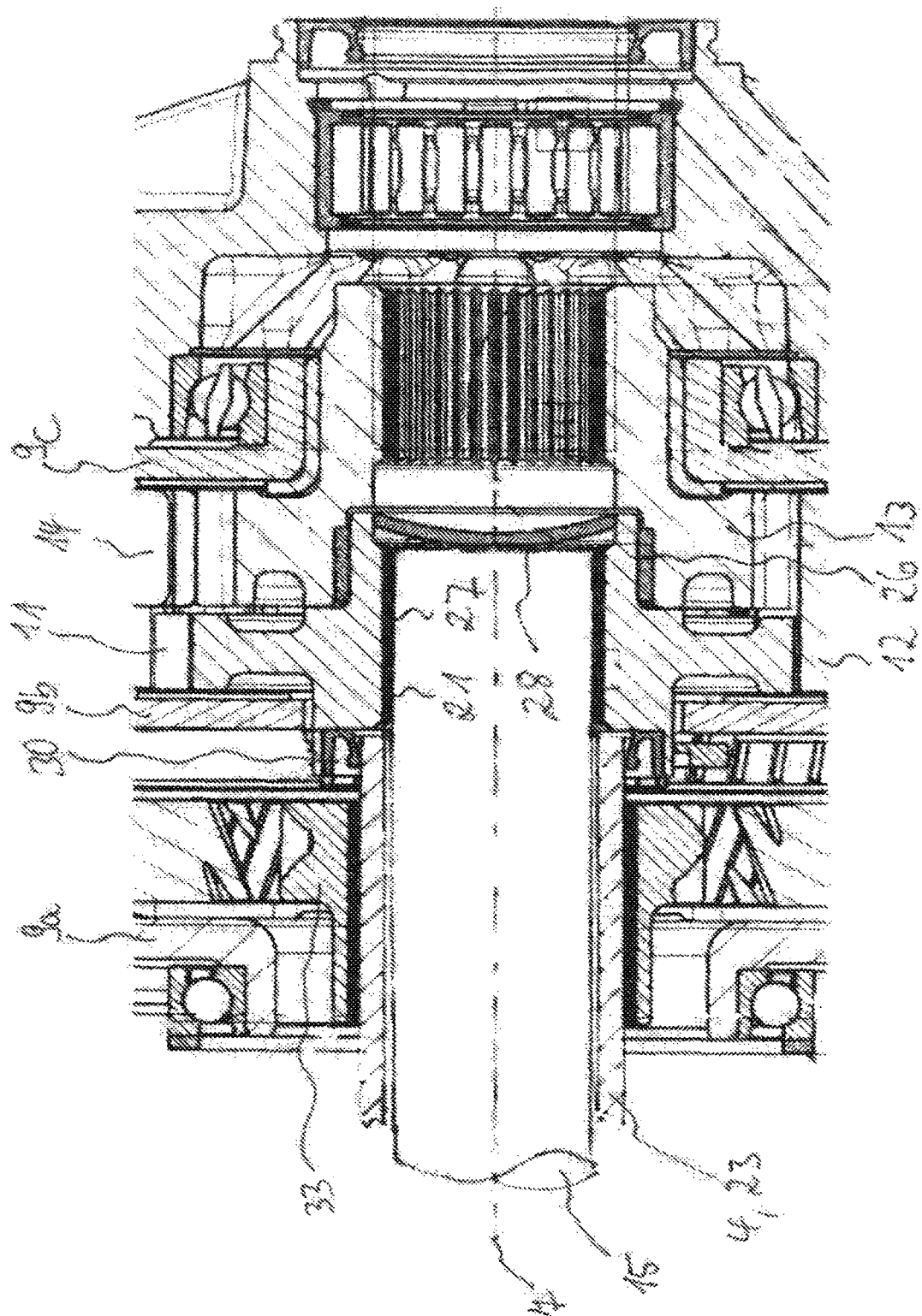
FIG. 2 is a cross-section of an electric drive unit, according to an embodiment.

FIG. 2 shows a graphic representation of a cut-out of drive unit 1 with a focus directed at the connections of output shafts 15 and 16 of transfer gearbox 3, in a longitudinal section along central axis 7 of drive unit 1.

Transfer gearbox 3 has a differential cage 9 formed from carrier segments 9a, 9b 9c, a set of compensating gears 12, a set of compensating gears 14, two output gears 11 and 13 and two output shafts 15 and 16. Transfer gearbox 3 is embodied in the design of a planetary drive as a spur gear differential. The differential cage is correspondingly a planetary carrier 9. The compensating gears are planetary gears 12 or 14 and the output gears are sun gears 11 and 13.

Output gears 11 and 13 are arranged axially next to one another on a joint axis of rotation which lies on central axis 7, and are rotatable relative to one another about the axis of rotation. Compensating gears 12 or 14 are mounted rotatably about bolt axes on planetary bolts 17 or 18. Planetary bolts 17 and 18 are fixed on planetary carrier 9. Compensating gears 12 of the first planetary set are in toothed engagement with output gear 11. Compensating gears 14 of the second planetary set cog with output gear 13. In each case one compensating gear 12 is in toothed engagement 19 with a compensating gear 14. Moreover, output gears 12 and 14 are supported radially on one another at a bearing point 26.

Input shaft 20 of the differential is planetary carrier 9 which is driven by double planetary gears 25, which are supported on an internal gear, of reduction gearbox 24. Planetary carrier 9 is mounted rotatably about central axis 7 in a housing, not represented, which is indicated by housing portions 34a-34e. First output gear 11 sits by a plug-in connection 21 in a rotationally fixed manner on first output shaft 15 and second output gear 13 with a further plug-in connection 21 in a rotationally fixed manner on second output shaft 16. Output shafts 15 and 16 lie coaxially opposite one another at the face side, wherein hollow shaft 23 forms a shaft feed-through 4 for first output shaft 15.

Shaft feed-through 4 or rotor shaft 4 is rotatable about central axis 7 relative to input shaft 20 and to output shafts 15 and 18. A gear wheel 33 sits on rotor shaft 4, which gear wheel is a sun gear 33 of reduction gearbox 24 embodied as a planetary drive. Sun gear 33 is a component of a gearbox-type operative connection between rotor shaft 4 embodied as a hollow shaft and input shaft 20 of transfer gearbox 3 and is in toothed engagement with a set of planetary gears 35 of double planetary gears 25.

An annular gap 5 is formed between shaft feed-through 4 and output shaft 15. First output gear 11, i.e. in this case first sun gear 11, is provided with a seal 30. Seal 30 bears in a sealing manner against a rotationally symmetrical surface portion 4a of shaft feed-through 4. Gaps 27 of respective plug-in connection 21 between output shafts 15 and 16 and respective sun gear 11 and 13 are furthermore optionally sealed off by a closure element 28 or 29. Closure element 28 or 29 can, as is represented in FIG. 1, be a sealing cap. The sealing cap is pushed onto the end of the respective output shaft. The base of the sealing cap lies opposite face side output shaft 15 or 16. Alternatively, closure element 28 or 29, as is represented in FIGS. 3 and 4, is in each case a cover.

Figure 3:
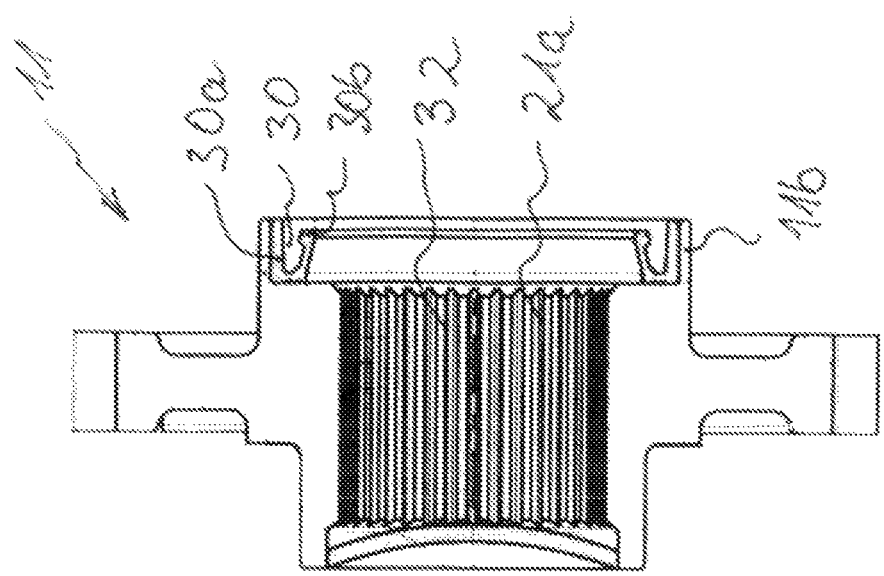
FIG. 3 is a cross-section of a sun gear within the electric drive unit, according to an embodiment.

FIG. 3 shows first sun gear 11 as an individual component in a longitudinal section along its axis of rotation.

Figure 4:
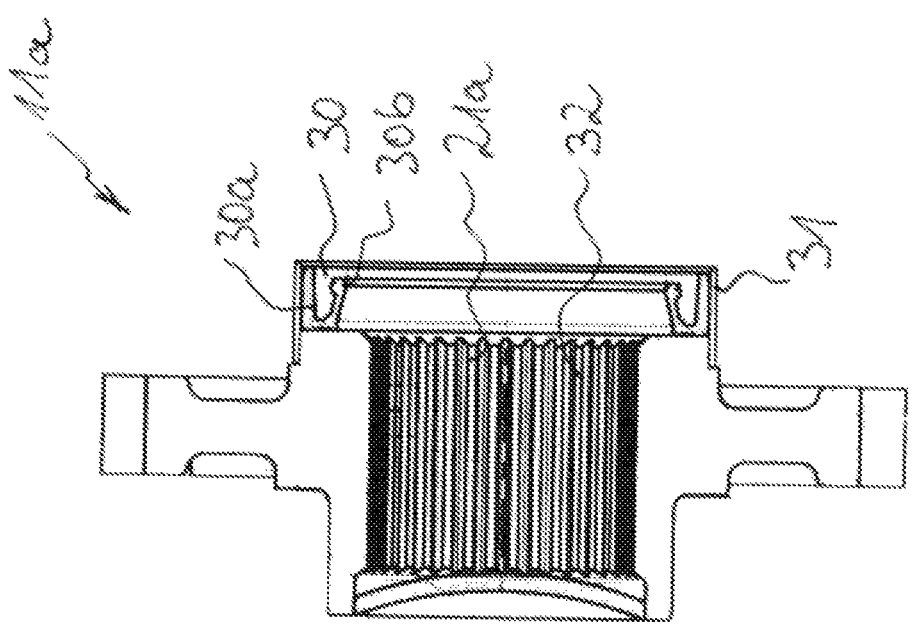
FIG. 4 is a cross-section of another embodiment of a sun gear within the electric drive unit.

FIG. 4 shows a further configuration of a sun gear 11a which differs from sun gear 11 by an alternative seal arrangement and which is also represented in a longitudinal section.

Sun gear 11 or 11a has a through-hole 32 which is provided with an inner spline 21a. Seal 30 is a radial shaft sealing ring which has a hollow-cylindrical seat portion 30a and a sealing lip 30b connected integrally thereto. Seal 30 sits with seat portion 30a in a hollow-cylindrical projection 11b which is formed in one piece with sun gear 11 represented in FIG. 3. The seal arrangement of sun gear 11a represented in FIG. 4 has a hollow-cylindrical ring 31. Ring 31 is pressed externally onto the hub of sun gear 11a and can, however, alternatively also be pressed into a hollow-cylindrical projection of the hub of the sun gear. Seal 30 sits in ring 31.

REFERENCE NUMBERS

1 Drive unit
2 Transmission device
3 Transfer gearbox/Differential
4 Shaft feed-through/Rotor shaft
4a Rotationally symmetrical portion of shaft feed-through
5 Annular gap
6 Planetary drive
7 Central axis
8 Planetary drive
9 Differential cage/Planetary carrier
9a Carrier segment of the planetary carrier
9b Carrier segment of the planetary carrier
9c Carrier segment of the planetary carrier
10 Planetary gear
11 Output gear/Sun gear
11a Sun gear
11b Projection of the sun gear
12 Compensating gear/Planetary gear
13 Output gear/Sun gear 14 Compensating gear/Planetary gear
15 Output shaft
16 Output shaft
17 Planetary bolt
18 Planetary bolt
19 Toothed engagement
20 Input shaft
21 Plug-in connection
21a Inner spline
22 Electric machine
23 Hollow shaft
24 Reduction gearbox
25 Double planetary gear
26 Bearing point
27 Gap
28 Closure element
29 Closure element
30 Seal
30a Seat portion of the seal
30b Sealing lip of the seal
31 Ring
32 Through-hole
33 Sun gear
34a-34e Housing portions
35 Planetary gears of the double planetary gears

The invention claimed is:

1. A transfer gearbox comprising an input shaft, a first output shaft, a second output shaft, first and second output gears, first compensating gears, second compensating gears, and a differential cage, wherein:
   the output gears are arranged axially next to one another on a joint axis of rotation and are rotatable relative to one another,
   the compensating gears sit rotatably on the differential cage,
   the first compensating gears are in toothed engagement with the first output gear and the second compensating gears are in toothed engagement with the second output gear,
   the first output gear sits in a rotationally fixed manner on the first output shaft and the second output gear sits in a rotationally fixed manner on the second output shaft, wherein at least one output shaft is guided through a shaft feed-through rotatably about the axis of rotation relative to the shaft feed-through,
   at least the first output gear is provided with a seal, wherein the seal bears in a sealing manner against a surface portion of the shaft feed-through,
   the first output gear has a through-hole which is concentric to the axis of rotation and in which the first output shaft is engaged,
   the through-hole is closed at a first end by a closure element, and
   the first output shaft extends from a second end of the through-hole opposite the first end.

2. The transfer gearbox as claimed in claim 1, wherein the seal is a radial shaft sealing ring with at least one sealing lip which bears against the surface portion of the shaft feed-through.

3. The transfer gearbox as claimed in claim 1, wherein the seal sits in a hollow cylindrical projection formed in one piece with the first output gear and running about the axis of rotation.

4. The transfer gearbox as claimed in claim 1, wherein the seal is received in a hollow cylindrical ring, wherein the ring sits concentrically to the axis of rotation on a hub of the first output gear.

5. The transfer gearbox as claimed in claim 1, wherein the output gears are supported radially on one another.

6. The transfer gearbox as claimed in claim 1, wherein the shaft feed-through is rotatable about the axis of rotation relative to the first output gear and the second output gear.

7. An electric drive unit having an electric machine and the transfer gearbox as claimed in claim 1, wherein the shaft feed-through is a hollow shaft which is connected in a rotationally fixed manner to a rotor of the electric machine.

8. The electric drive unit as claimed in claim 7, wherein a gear wheel which is axially adjacent to the first output gear sits in a rotationally fixed manner on the hollow shaft.

9. The electric drive unit as claimed in claim 8, wherein the gear wheel is a component of a gear-type operative connection between the hollow shaft and the input shaft of the transfer gearbox, wherein the input shaft of the transfer gearbox is a differential cage, or an internal gear, or a set of double planetary gears.

10. A transfer gearbox comprising an input shaft, a first output shaft, a second output shaft, first and second output gears, first compensating gears, second compensating gears, and a differential cage, wherein:
    the output gears are arranged axially next to one another on a joint axis of rotation and are rotatable relative to one another,
    the compensating gears sit rotatably on the differential cage,
    the first compensating gears are in toothed engagement with the first output gear and the second compensating gears are in toothed engagement with the second output gear,
    the first output gear sits in a rotationally fixed manner on the first output shaft and the second output gear sits in a rotationally fixed manner on the second output shaft, wherein at least one output shaft is guided through a shaft feed-through rotatably about the axis of rotation relative to the shaft feed-through,
    at least the first output gear is provided with a seal, wherein the seal bears in a sealing manner against a surface portion of the shaft feed-through, and
    the seal sits in a hollow cylindrical projection formed in one piece with the first output gear and running about the axis of rotation.

11. A transfer gearbox comprising an input shaft, a first output shaft, a second output shaft, first and second output gears, first compensating gears, second compensating gears, and a differential cage, wherein:
    the output gears are arranged axially next to one another on a joint axis of rotation and are rotatable relative to one another,
    the compensating gears sit rotatably on the differential cage,
    the first compensating gears are in toothed engagement with the first output gear and the second compensating gears are in toothed engagement with the second output gear,
    the first output gear sits in a rotationally fixed manner on the first output shaft and the second output gear sits in a rotationally fixed manner on the second output shaft, wherein at least one output shaft is guided through a shaft feed-through rotatably about the axis of rotation relative to the shaft feed-through, at least the first output gear is provided with a seal, wherein the seal bears in a sealing manner against a surface portion of the shaft feed-through, and
the output gears are supported radially on one another.

* * * * *